US010711393B2

(12) United States Patent
Rykaczewski et al.

(10) Patent No.: US 10,711,393 B2
(45) Date of Patent: Jul. 14, 2020

(54) SELF-SEALING AND SELF-DECONTAMINATING MATERIALS, METHODS OF MAKING, AND METHODS OF USE (71) Applicant: ARIZONA BOARD OF REGENTS ON BEHALF OF ARIZONA STATE UNIVERSITY, Scottsdale, AZ (US)

(72) Inventors: Konrad Rykaczewski, Tempe, AZ (US); Timothy Burgin, Scottsdale, AZ (US)

(73) Assignees: Arizona Board of Regents on behalf of Arizona State University, Scottsdale, AZ (US); United States of America as Represented by the Secretary of the Navy, Arlington, VA (US)

( * ) Notice: Subject to any disclaimer, the term of this patent is extended or adjusted under 35 U.S.C. 154(b) by 213 days.

(21) Appl. No.: 15/587,091

(22) Filed: May 4, 2017

(65) Prior Publication Data
US 2017/0321373 A1     Nov. 9, 2017

Related U.S. Application Data (60) Provisional application No. 62/331,883, filed on May 4, 2016.

(51) Int. Cl.
*D06M 15/285* (2006.01)
*D06M 15/263* (2006.01)
(Continued)

(52) U.S. Cl.
CPC ............ *D06M 15/285* (2013.01); *A62D 5/00* (2013.01); *C09D 133/06* (2013.01);
(Continued)

(58) Field of Classification Search
CPC ...... A26D 5/00; C09D 133/06; C09D 133/14; C09D 133/24
(Continued)

(56) References Cited

U.S. PATENT DOCUMENTS 5,624,713 A    4/1997  Ramer
7,285,576 B2 * 10/2007  Hyde .................... A61L 15/225
                                                      424/489
(Continued)

FOREIGN PATENT DOCUMENTS

DE    19818956       11/1998
JP    H01170932      7/1989
(Continued)

OTHER PUBLICATIONS

Anand, S. et al., "Enhanced Condensation on Lubricant-Impregnated Nanotextured Surfaces", ACS Nano, Oct. 2012, vol. 6, No. 11, pp. 10122-10129.
(Continued)

*Primary Examiner* — Vincent Tatesure
(74) *Attorney, Agent, or Firm* — Fish & Richardson P.C.

(57) ABSTRACT

Some embodiments of the invention include an article of manufacture that is self-sealing, and a method of preparing the article of manufacture. The article of manufacture includes at one or more base layers with a plurality of overlapping strands, and at least one polymer coating layer at least partially covering at least some portions of at least some strands of at least a portion of the base layer. The polymer coating layer can swell by absorbing at least one target substance. A plurality of voids is distributed between at least some of the overlapping strands, where upon swelling by a target substance, at least some of the voids reversibly reduce in size or partially close, or completely seal.

12 Claims, 5 Drawing Sheets

(51) Int. Cl.
  *C09D 133/24*   (2006.01)
  *C09D 133/14*   (2006.01)
  *D06M 23/08*   (2006.01)
  *A62D 5/00*    (2006.01)
  *C09D 133/06*   (2006.01)

(52) U.S. Cl.
  CPC ......... *C09D 133/14* (2013.01); *C09D 133/24* (2013.01); *D06M 15/263* (2013.01); *D06M 23/08* (2013.01)

(58) Field of Classification Search
  USPC .......................................................... 442/59
  See application file for complete search history.

(56) References Cited

U.S. PATENT DOCUMENTS

| | | |
|---|---|---|
| 2011/0104972 A1 | 5/2011 | Liu |
| 2017/0058141 A1 | 3/2017 | Rykaczewski et al. |
| 2017/0183101 A1 | 6/2017 | Rykaczewski et al. |
| 2018/0215927 A1 | 8/2018 | Rykaczewski |
| 2019/0181069 A1 | 6/2019 | Rykaczewski et al. |

FOREIGN PATENT DOCUMENTS

| | | |
|---|---|---|
| JP | H05240251 | 9/1993 |
| JP | 2004037764 | 2/2004 |
| WO | WO2006091235 | 8/2006 |
| WO | WO2012100099 | 7/2012 |
| WO | WO2014012080 | 1/2014 |
| WO | WO2015143389 | 9/2015 |

OTHER PUBLICATIONS

Bauer, U. et al., "The insect-trapping rim of Nepenthes pitchers", Plant Signaling & Behavior, Nov. 2009, vol. 4, No. 11, pp. 1019-1023.
Bohn, H. et al., "Insect aquaplaning: Nepenthes pitcher plants capture prey with the peristome, a fully wettable water-lubricated anisotropic surface", Proceedings of the National Academy of Sciences of the United States of America, Sep. 2004, vol. 101, No. 39, pp. 14138-14143.
Cadarette, et al. Ergonomics 2006, 49, 209; R. Joy, et al. Mil. Med. 1968, 133, 458.
Cassie et al., "Wettability of porous surfaces", Transactions of the Faraday Society, Jan. 1944, vol. 40, pp. 546-551.
Damle et al, ACS App. Mater. Inter., 2015, 4224-4232.
Elyashevich et al. Polymer Sci. 2009, 5, 550-553.
Goldman, Mil. Med. 1963, 128.
Hejazi, V. et al., "Wetting Transitions in Two-, Three-, and Four-Phase Systems", Langmuir, Nov. 2011, vol. 28, No. 4, pp. 2173-2180.
Horkay et al., Biomacromolecules, 2001, 2, 195-199.
Hu et al., Smart Mater. Struct. 2012, 21, 053001.
Joy et al., "A Method of Relating Physiology and Military Performance, A Study of Some Effects of Vapor Barrier Clothing in a Hot Climate" Mil. Med, 1968, 458-470.
Jung et al., Langmuir, 2011, 27, 3059-3066.
Kabiri et al., Pol. Adv. Tech. 2013, 24, 28-33.
Lombardi, J. et al., "Lotus-LADM Based Decontaminating Suraces", US Army Research Office, May 2007, 48 pages.
Lucantonio et al., Soft Matter, 2014, 10, 2800-2804.
Lucantonio, et al., J. Mech. Phys. Solids, 2013, 61, 205-218.
Marketsandmarkets., "Protective Clothing Market worth $9,290 Million by 2020" [online], Market Research Report, 2016 [retrieved on Jun. 6, 2019 from archive.org as it appeared on Mar. 30, 2016], retrieved from the internet: <URL:https://web.archive.org/web/20160330092417/http://www.marketsandmarkets.com/PressReleases/protective-chothing.asp>.
Marketwatch., "Protective Clothing Market Growing at 6.2% CAGR to 2020 Driven by Increasing Demand from Oil & Gas and Construction & Manufacturing Industries" [online], Market Watch, Sep. 2015 [retrieved Jun. 6, 2019 from marketwatch.com], retrieved from the internet: <URL:https://www.marketwatch.com/press-release/protective-clothing-market-growing-at-62-cagr-to-2020-driven-by-increasing-demand-from-oil-gas-and-construction-manufacturing-industries-2015-09-08-2203110>.
Ono et al., "Lipophilic polyelectrolyte gels as super-absorbent polymers for nonpolar organic solvents" Nature Publishing Group, Jun. 2007, vol. 6, 429-433.
Ono et al., Nature materials 2007, 6, 429; T. Ono, T. Sugimoto, S. Shinkai, K. Sada, Adv. Fund. Mater. 2008, 18, 3936.
Patent Cooperation Treaty, International Searching Authority, International Search Report for PCT/US2012/021928, 8 pages, dated Oct. 8, 2012.
Rykaczewski, K. et al., "Analysis of Electron Beam Induced Deposition (EBID) of Residual Hydrocarbons in Electron Microscopy", Journal of Applied Physics, Mar. 2007, vol. 101, No. 5, article 054307, 13 pages.
Rykaczewski, K. et al., "Dropwise Condensation of Low Surface Tension Fluids on Omniphobic Surfaces", Scientific Reports, Mar. 2014, vol. 4, No. 4158, 8 pages.
Rykaczewski, K. et al., "Electron Beam Heating Effects during Environmental Scanning Electron Microscopy Imaging of Water Condensation on Superhydrophobic Surfaces", Applied Physics Letters, Mar. 2011, vol. 98, No. 9, article 093106, 4 pages.
Rykaczewski, K. et al., "Mechanism of Frost Formation on Lubricant-Impregnated Surfaces", Langmuir, Apr. 2013, vol. 29, No. 17, pp. 5230-5238.
Shillingford, C. et al., "Fabrics coated with lubricated nanostructures display robust omniphobicity", Nanotechnology, 2014 (available online: Dec. 2013), vol. 25, article 014019, 12 pages.
Smith, J. et al., "Droplet mobility on lubricant-impregnated surfaces", Soft Matter, 2013 (available online: Dec. 2012), vol. 9, No. 6, pp. 1772-1780.
Sohn and D. Kim, J. App. Pol. Sci., 2003, 87, 252-257.
Speckman, et al. Int. J. Ind. Ergonomics 1988, 3, 121.
Stebbins "Can Naval Surface Forces Operate Under Chemical Weapons Conditions?" Naval Postgraduate School. Monterey, California, Jun. 2002.
Sun et al., Adv. Mater. Inter., 2015, 2, 2196.
Tillet, B. Boutevin, B. Ameduri, Prog. Pol. Sci. 2011, 36, 191.
Tuteja, A. et al., "Designing Superoleophobic Surfaces", Science, Dec. 2007, vol. 318, No. 5856, pp. 1618-1622.
Wenzel, R., "Resistance of Solid Surfaces to Wetting by Water", Industrial and Engineering Chemistry, Aug. 1936, vol. 28, No. 8, pp. 988-994.
Wong, T-S. et al., "Bioinspired self-repairing slippery surfaces with pressure-stable omniphobicity", Nature, Sep. 2011, vol. 477, No. 7365, pp. 443-447.
Zhang, et al. Macromol. Mater. Eng. 2003, 288, 380.

* cited by examiner

SELF-SEALING AND SELF-DECONTAMINATING MATERIALS, METHODS OF MAKING, AND METHODS OF USE

RELATED APPLICATIONS

This application claims priority to U.S. Provisional Application Ser. No. 62/331,883 filed on May 4, 2016, the entire contents of which are incorporated herein by reference.

BACKGROUND

When sent into an area with a high risk of exposure to chemical weapon agents ("CWA"), troops are deployed in mission oriented protective posture ("MOPP") gear, and are required to remain in the gear until either the threat passes or they leave the high risk area. The goal of MOPP apparel is to prevent transport of chemical and biological agents. Currently this is achieved using MOPP apparel that includes pore-less polymeric coatings. However, in addition to being impermeable to harmful species, the coating is a barrier for moisture transport. As a result, evaporative cooling through sweating, along with conductive, convective, and radiative cooling is significantly diminished, or completely prevented. This places a significant thermal load on the soldier, and limits the safe use of MOPP gear to about 1 hour in a moderate climate. This time limit is even further decreased in regions such as the Middle-East that can experience significant solar loads and ambient temperatures above 130° F. Consequently, to enable working in MOPP gear for any extended period of time, additional special garments must be worn, including garments with cooling provided by phase change materials (e.g. ice) or using active fluid pumping. Although effective, the addition of a cooling system increases the size, weight, complexity, and cost of the MOPP gear. Furthermore, additional requirements for operation may not always be available in the field, such as batteries or other power sources to run pumps or refrigeration units to pre-freeze the phase change material. In addition, highly specialized cooled MOPP gear may not be readily available in case of a surprise attack, for example, such as in the case of the recent Sarin attack in Syria. Further, in addition to the problems posed by thermal issues, many materials currently utilized in MOPP gear can absorb varying amounts of some CWA, which has the potential to cause a range of serious problems with their use in the field, including, for example, post-exposure CWA release outside of a high risk zone. The majority of CWA substances are low vapor pressure and surface tension liquids with extreme toxicity that are spread in aerosol form. Consequently, to rapidly form an effective barrier, the barrier materials must seal upon contact with a few micro-droplets of the liquid.

SUMMARY

Some embodiments include an article of manufacture comprising at least one base layer comprising a plurality of overlapping strands, and at least one polymer coating layer at least partially covering at least some portions of at least some strands of at least a portion of the at least one base layer. In some embodiments, the at least one polymer coating layer is configured and arranged to swell by at least partially absorbing at least one target substance. Some embodiments include a plurality of voids distributed between at least some of the overlapping strands, where upon swelling by the at least one target substance, at least some of the voids can reversibly reduce in size or partially close, or completely seal.

In some embodiments of the invention, at least a portion of the at least one base layer includes a weave, knit, mesh, mesh-like material, and/or netting. In some embodiments, the at polymer coating layer comprises Poly-N-alkyl-N-phenylacrylamide polymer with a monomer sub-unit of:

wherein the alkyl group has between 1 and 18 carbon atoms.

In some embodiments, the polymer coating layer comprises Poly-N-phenylacrylamide polymer with a monomer sub-unit of:

In some further embodiments, the polymer coating layer comprises Poly-3,5-bis(ethoxy(ethoxymethyl))phenyl acrylate.

In other embodiments, the polymer coating layer comprises a phenyl acrylate polymer of:

wherein n=0-18.

In some further embodiments, the polymer coating layer comprises polymer microspheres. In some embodiments, the polymer microspheres are spray-coated, polymer microspheres, dip-coated polymer microspheres, and water-fall coated polymer microspheres. In some further embodiments, the polymer microspheres comprise an elastomer polymer. In other embodiments, the polymer microspheres comprise a core-shell polymer microsphere.

In some embodiments, the polymer coating layer includes a reactive monomer. In some further embodiments, the reactive monomer is crosslinkable within the polymer layer.

In some embodiments, the strands include a polymer selected from polyester, polypropylene, polyethylene, nylon, rayon, acrylic, polyurethane, Teflon®, ethylene-vinyl acetate copolymer, aramid-based polymer, sodium acrylate polymer, polydimethylsiloxane. In other embodiments, the strands include a natural or naturally-derived materials selected from cotton, wool, silk, cellulosic viscose, cellulosic acetate, cupro, and linen. In some embodiments, the target substance is a chemical warfare agent.

Some embodiments include a method of preparing a self-sealing material or surface comprising providing at least one base layer comprising a plurality of overlapping strands and a plurality of voids distributed between at least some of the overlapping strands. In some embodiments, the method includes applying one or more polymer coating layers to the at least one base layer so that at least some of the polymer coating layer at least partially covers at least some portions of at least some strands of at least a portion of the at least one base layer. In some embodiments of the method, the polymer coating layer is swellable by at least partially absorbing at least one target substance, where at least some of the voids reduce in size or partially close, or completely seal.

In some embodiments of the method, the polymer coating layer comprises Poly-N-alkyl-N-phenylacrylamide polymer with a monomer sub-unit of:

wherein the alkyl group has between 1 and 18 carbon atoms.

In some embodiments, the polymer includes a solid or bulk polymer, polymer microspheres, and/or monomer.

In some embodiments, the polymer coating layer comprises Poly-N-phenylacrylamide polymer with a monomer sub-unit of:

In some further embodiments of the method, the polymer coating layer comprises a phenyl acrylate polymer of:

wherein n=0-18.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Some embodiments include smart self-decontaminating and breathable fabric that self-seals into an impermeable barrier in response to contact with one or more target substances such as a wide range of CWA agents. In normal conditions, the proposed smart fabric would be breathable and could be deployed as part of regular gear, minimizing the need for specialized protective gear and related equipment. Some embodiments of the invention include smart self-decontaminating and breathable fabric that can self-seal into an impermeable barrier in response to contact to conventional CWA materials. Some embodiments include materials formed into a fabric material with open pores that, in the absence of the presence of CWA materials, can enable or allow moisture transport through the fabric from one side to an opposite side. In some embodiments, upon contact with CWA materials (e.g., such as CWA in the form of micro-droplets), fabrics that include one or more coatings of one or more absorbing polymers disclosed herein (e.g., such as elastomers) can rapidly seal due to physical swelling of the polymer. Further, some embodiments include materials that can degrade absorbed CWA materials. For example, some embodiments include the addition of a carbon-based material (e.g., such as AZTM-TEDA available from Calgon Carbon Corporation, 500 Calgon Carbon Drive, Pittsburgh, Pa.) or similar material that is mixed with the absorbing polymers.

In some embodiments of the invention, the materials useful for forming or creating self-sealing and self-decontaminating materials, structures, layers, articles or goods can include at least one type of fabric or fabric-forming material, at least one textile or textile-forming material, and/or at least one yarn or yarn-forming material. In some embodiments of the invention, the materials useful for fabricating self-sealing and self-decontaminating materials can include woven and/or knitted materials. In some embodiments, any portion of the materials can comprise a plurality of overlapping strands such as fibers, threads, wires, whiskers, and/or filaments (or any combination thereof) that can be assembled as a weave, knit, mesh, mesh-like material, and/or netting. In some embodiments, the materials that can be formed into a single layer of weave, knit, mesh, and or netting. In some embodiments, a multi-layer garment can be used allowing the development of a multifunctional protective system. For example, some further embodiments include double-layer weave, knit, mesh, and or netting. Other embodiments include more than two layers of weave, knit, mesh, and or netting. In some further embodiments, the materials useful for self-sealing and self-decontaminating materials can include an expanded weave, knit, mesh, and or netting that includes a structure that is three-dimensional (e.g., similar to a sponge or sponge-like structure).

In some further embodiments of the invention, the materials useful for self-sealing and self-decontaminating materials include non-woven portions. For example, in some embodiments, at least a portion of the materials can comprise woven or knitted fibers, threads, wires, strands, whiskers, and/or filaments that are assembled as a weave, knit, mesh, and or netting. In other embodiments, the materials can be completely non-woven (i.e., can be substantially devoid of knitted or woven portions).

Some embodiments can include materials that comprise woven or knitted fibers, threads, wires, strands, whiskers, and/or filaments that can be assembled as a weave, knit, mesh, and/or netting coated before they are woven or knitted. In some other embodiments, the materials can comprise woven or knitted fibers, threads, wires, strands, whiskers, and/or filaments that are assembled as a weave, knit, mesh, and or netting and then at least partially coated with an active layer, film or material, including, but not limited to a polymer, copolymer, polymer-blend, that is configured to absorb a target substance such as one or more CWA materials. In some embodiments, the active layer, film or material can comprise an elastomer. In other embodiments, the active layer, film or material can comprise a non-elastomer.

In some embodiments of the invention, the materials useful for self-sealing and self-decontaminating materials include at least one synthetic material and/or at least one non-synthetic material. For example, some embodiments can include naturally-derived materials including, but not limited to, cotton, wool, silk, cellulosic (viscose, acetate, cupro), and linen. In some other embodiments, the materials useful for self-sealing and self-decontaminating materials include at least one synthetic material including, but not limited to, any polymer, copolymer and/or polymer-blend of polyester, polypropylene, polyethylene, nylon, rayon, acrylic, polyurethane, Teflon®, ethylene-vinyl acetate copolymer, or a combination thereof. Some further embodiments include aramids, including, but not limited to KEVLAR® materials. KEVLAR is a registered trademark of E.I. DuPont de Nemours & Company. Teflon® is a registered trademark of DuPont.

Figure 1:
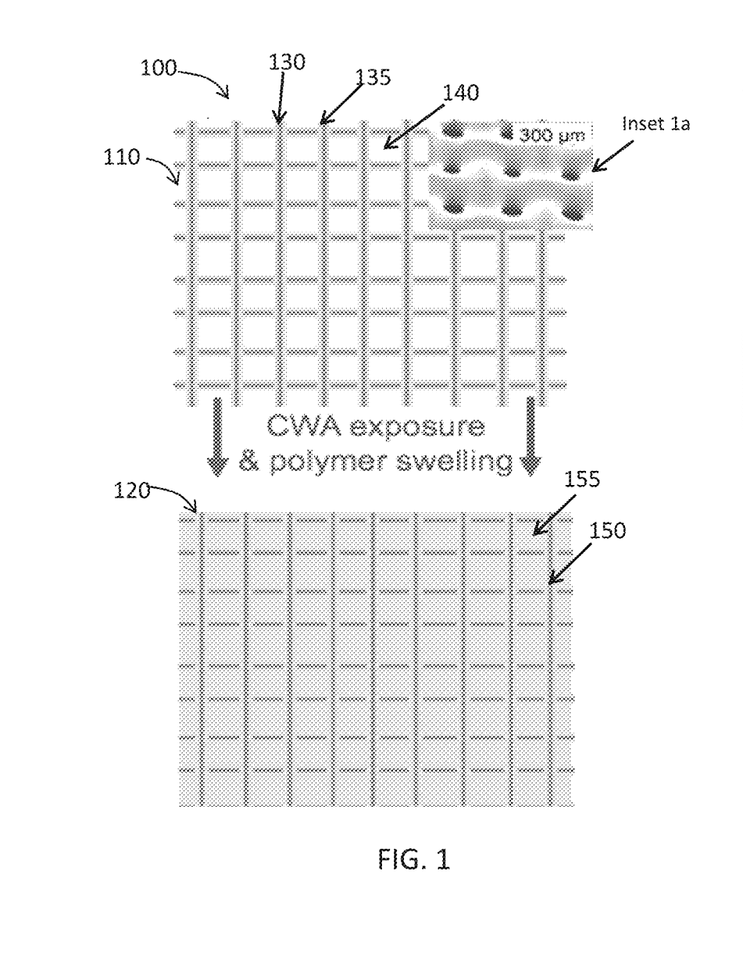
FIG. 1 shows a schematic illustration of an open-pore breathable fabric before and after exposure to chemical weapon (CW) agents in accordance with some embodiments of the invention.

Referring to FIG. 1 material transformation schematic 100, some embodiments include an open-pore fabric material 110 comprising a matrix of fibers 130 with voids or pores 140 formed between the fibers 130. In some embodiments, the fibers 130 can be coated with a coating 135 (see inset 1a) which has a high absorption capacity for a broad range chemical liquids including CWA's. In some embodiments, when exposed to one or more CWA materials, the coating 135 can swell, which in turn can cause the size of the pores 140 to decrease (shown as self-sealed impermeable fabric 120). In some embodiments, the open-pore fabric material 100 can comprise any of the materials or combinations of materials described earlier. Further, in some embodiments, the coating 135 can comprise any of the active layer, film or materials described earlier. In some embodiments, the number, spacing, and thickness of fibers 130, and/or size of the pores 140 can vary from that illustrated in FIG. 1. For example, in some embodiments, the size of the pores 140 can be smaller than that represented in FIG. 1 due to thicker fibers 130, closer spacing of fibers 130, and/or the thickness of the coating 135. The self-sealed impermeable fabric 120 shows matrix of fibers 150 with the coating 155 extending throughout the fabric 120, and represents open-pore fabric material 110 after CWA exposure.

Figure 2:
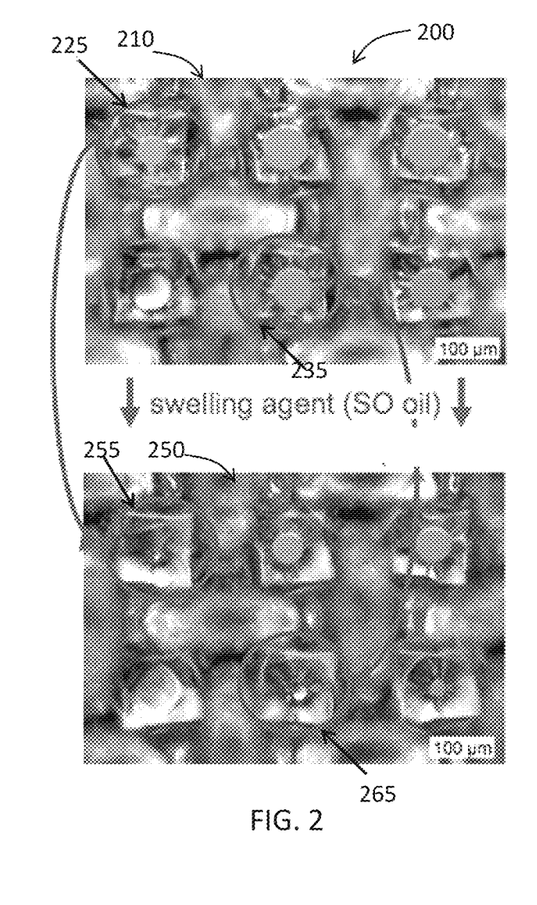
FIG. 2 shows images of PDMS polymer before and after exposure to silicone oil in accordance with some embodiments of the invention.

FIG. 2 shows images of polydimethylsiloxane ("PDMS") polymer before (image 210) and after (image 250) exposure to silicone oil in accordance with some embodiments of the invention. In this non-limiting example embodiment, in the image 210, voids 225, 235 are shown (generally corresponding to pores 140 shown in FIG. 1). Following swelling in silicone oil, the non-limiting embodiments in image 250 shows the closed ports 255, 265, corresponding to voids 225,235. In some embodiments, the closure is reversible (e.g. when at least some of the silicone oil is extracted or migrates from the polymer).

Figure 3:
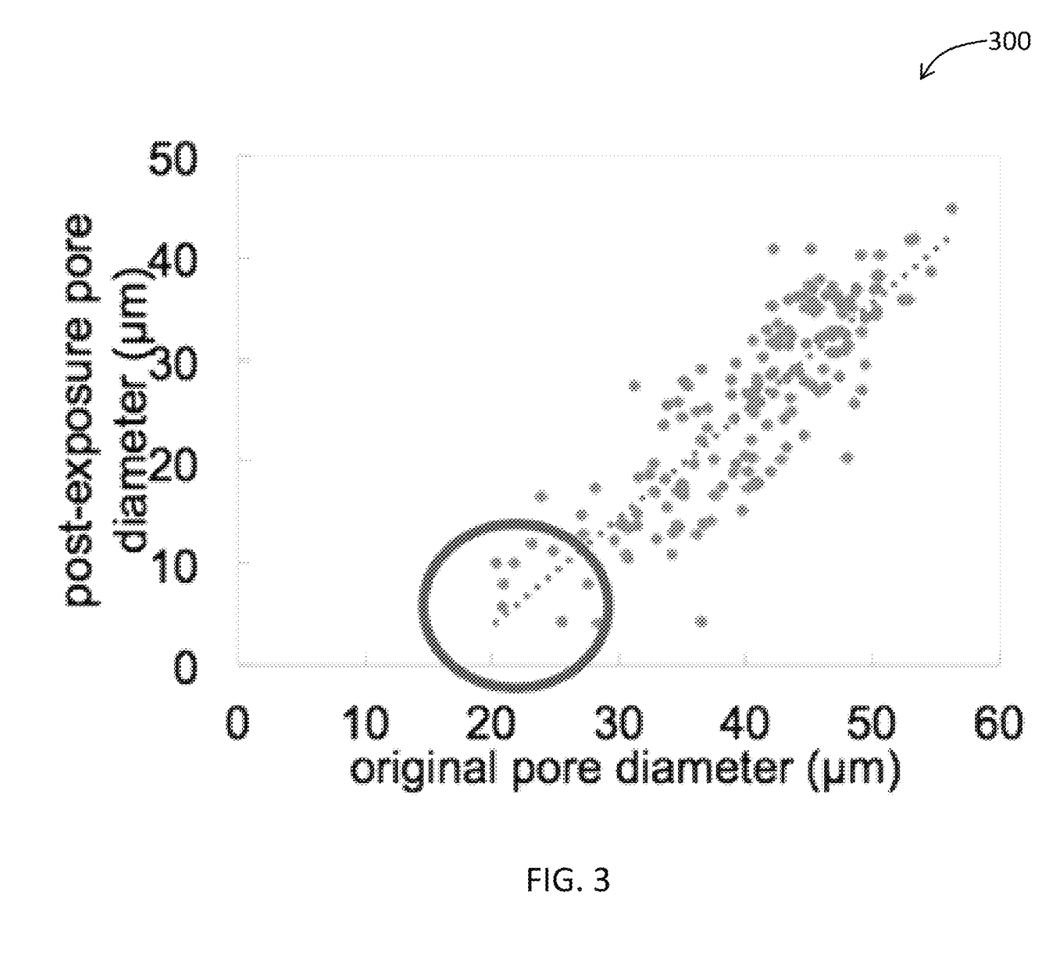
FIG. 3 illustrates results showing self-sealing fabric capability made of fibers/mesh coated with an absorbent polymer in accordance with some embodiments of the invention.

FIG. 3 illustrates a plot 300 with results showing self-sealing fabric capability made of fibers/mesh coated with an absorbent polymer in accordance with some embodiments of the invention. The results for FIGS. 2 and 3 illustrate that with proper sizing, the pores can be completely sealed in response to swelling (e.g. in some embodiments, the original pore diameter is below about 20 µm for the illustrative example of PDMS swelling with 10 cSt viscosity silicone oil). In some embodiments, while the volume of PDMS roughly doubles upon exposure to the utilized silicone oil, some active layers or coatings can have a higher swelling ratio when exposed to CWA's and other specific substances.

Figure 4:
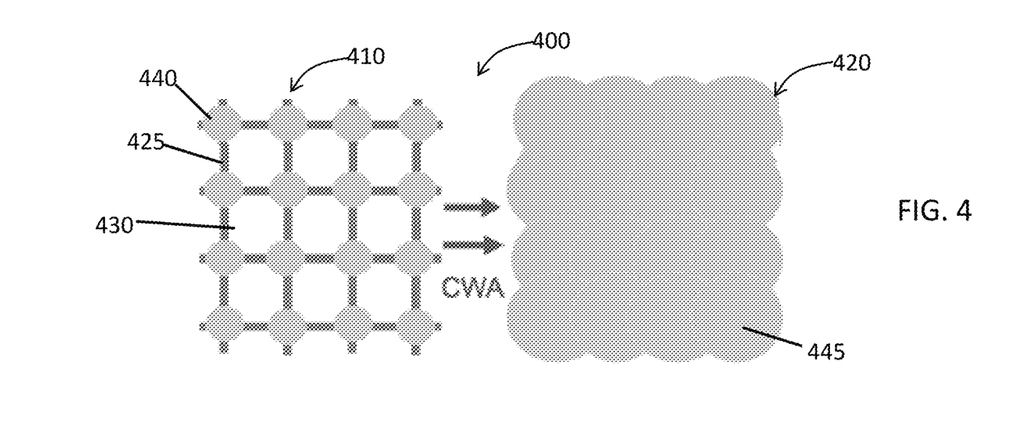
FIG. 4 shows a schematic of alternative self-sealing fabric achieved with absorbing polymeric microspheres in accordance with some embodiments of the invention.

In some embodiments of the invention, the active layer or coating can comprise microspheres of the absorbing polymers. For example, FIG. 4 shows a schematic 400 of alternative self-sealing fabric 410 achieved with absorbing polymeric microspheres 440 (shown generally positioned around or over the intersection of two fibers 425 at the corner of pores 430). The schematic 400 illustrates that upon swelling with CWA, a distribution of microspheres can create a barrier coating (shown as 445 on the fabric 420). In some embodiments, microspheres 440 can be easily and rapidly applied to various materials using simple techniques such as spray-coating, dip-coating, water-fall coating, or other conventional coating process. In some embodiments, individual fibers 425 can be coated with an elastomeric polymer using dip-coating. Some embodiments include controlled post polymerization cross-linking that can be performed at or near room temperature through the introduction of a reactive monomer into the polymer structure, followed by reaction with a cross-linking agent. In other embodiments, emulsion polymerization can be used to synthesize microspheres of the elastomer or core-shell microspheres including secondary material for CWA degradation. In some embodiments, these materials can be applied to different fabrics using spray-coating with an adhesive. In some embodiments, microspheres can be sprayed with an elastic adhesive that can result in formation of a composite (e.g., not only with decontamination particles, but comprising an adhesive-super absorbing polymer ("SAP") microsphere composite.

Figure 5:
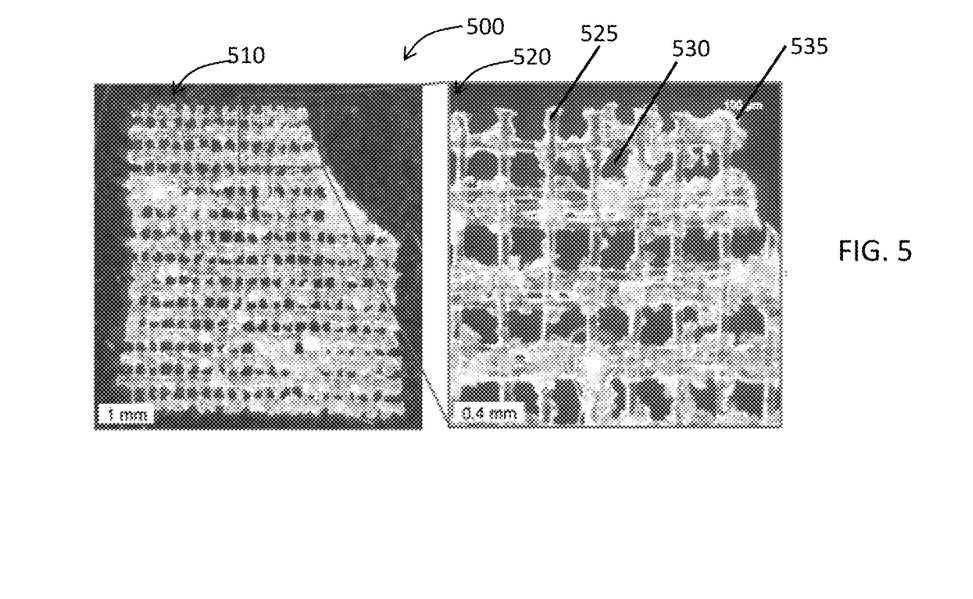
FIG. 5 is shows images of nylon fabric covered in a plurality of example superabsorbent polymer (sodium polyacrylate) particles before exposure to water.
Figure 6:
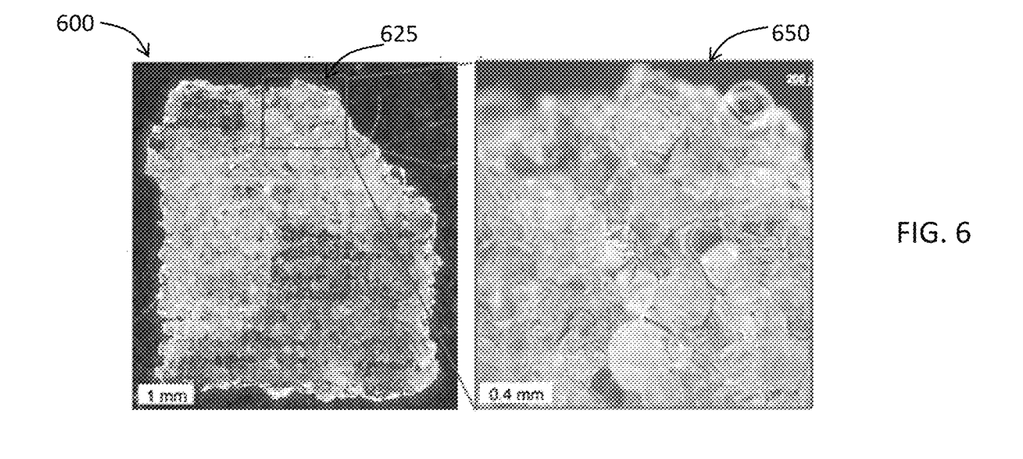
FIG. 6 shows the nylon fabric polymer with polymer (sodium polyacrylate) particles of FIG. 5 after exposure to water.

FIG. 5 shows images 500 of nylon fabric polymer (shown as fibers 525 and pores 530 in the magnified image 520 of image 510) covered in example super-absorbing polymer (sodium polyacrylate) particles 535 before exposure to water. Further, images 600, with inset 625 (shown at higher magnification in image 650) of FIG. 6 shows the nylon fabric polymer with polymer (e.g., sodium polyacrylate) particles of FIG. 5 after exposure to water. It has been observed that, in some cases, the particles of sodium polyacrylate can absorb a quantity of water that is equal to several hundred times its own weight). Active layers or coatings of particles of sodium polyacrylate can be combined with materials that absorb chemical vapors and chemically degrade them to non-toxic products. For example, some products can be synthesized by mixing powdered AZTM-TEDA carbon and the coating precursor prior to polymerization/cross-linking. Upon polymerization, the particles can be locked into the polymer matrix.

Figure 7:
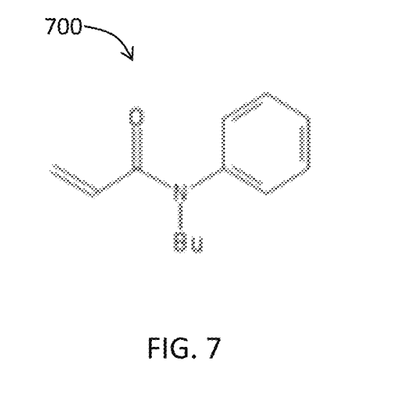
FIGS. 7 and 8 show chemical structures of target monomers for the preparation of selectively absorbent polymer coatings in accordance with some embodiments of the invention.
Figure 8:
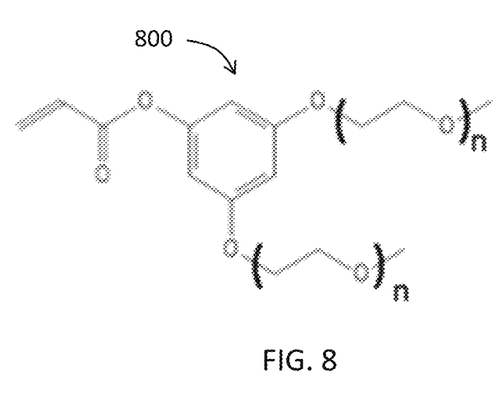

Some embodiments include polymers that can swell to several times their dry weight on exposure to one or more CWA's. Some embodiments include polymers prepared from the monomers 700, 800 shown in FIGS. 7 and 8. For example, referring to FIG. 7, some embodiments include the use of N-butyl-N-phenylacrylamide. Further, other embodiments can include N-butyl-N-phenylacrylamide related compounds including different lengths of the alkyl group on the nitrogen (e.g., from 0 to 18 carbon atoms), and/or various substitution on the phenyl ring (e.g., such as methyl, ethyl, halogen, ether, etc.), and/or larger aromatic ring groups (e.g., naphthyl, anthracenyl, etc.) Referring to FIG. 8, some embodiments include the use of 3,5-bis(ethoxy(ethoxymethyl))phenyl acrylate, with n=2 related compounds and including different values of n (e.g., with n being 0-18), as well as propylene oxide oligomers with the same n values. In some embodiments, the monomers can produce materials that are 1) non-swelling on exposure to water, 2) have a many degrees of freedom in regards to internal bond rotation to enhance dissolution of the side chains and provide a low barrier to backbone rearrangement on swelling, 3) have a branched side chain structure to minimize interaction between polymer strands, and 4) have polarizable aromatic moieties built into the structure to increase Van der Waals interaction of the side chains with the target liquids.

Figure 9:
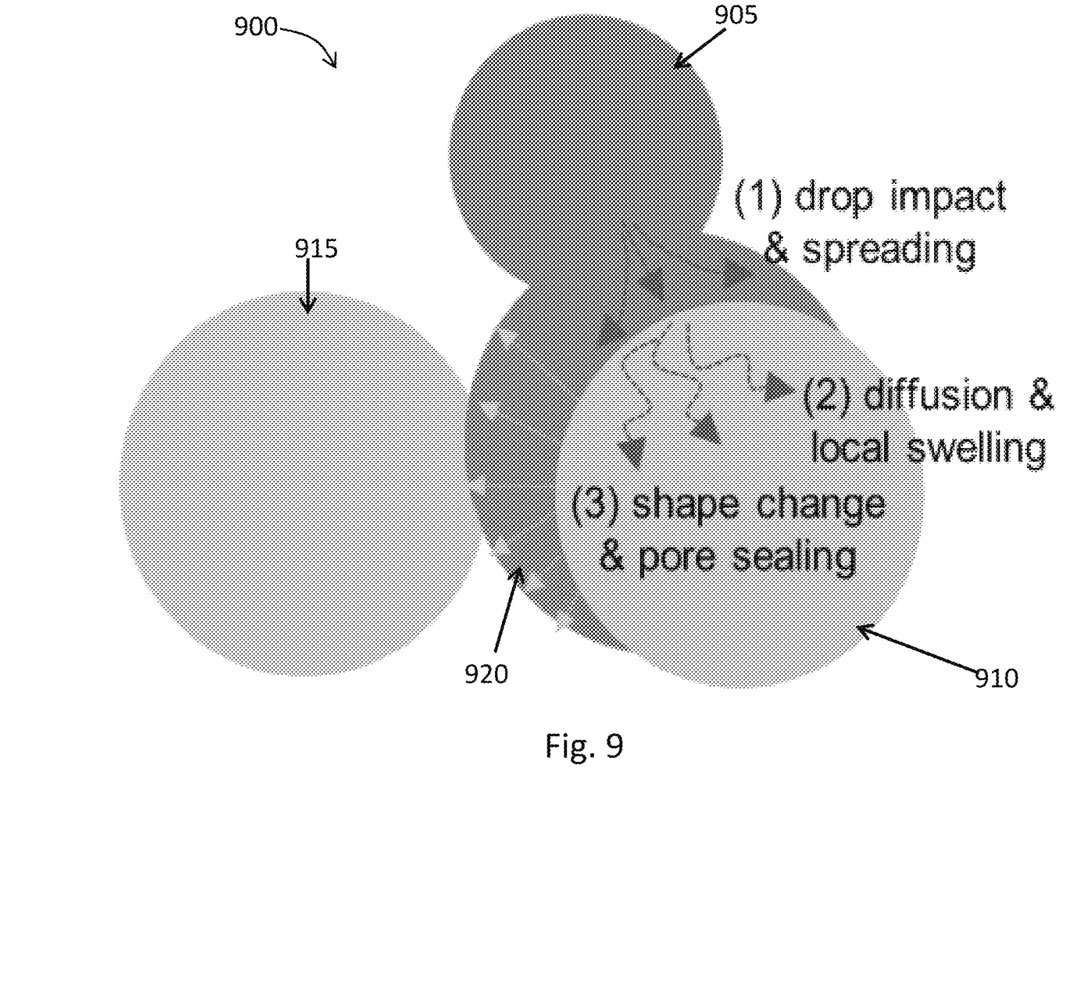
FIG. 9 shows a schematic of relevant transport and chemo-mechanical processes involved in micro-drop impact onto absorbing elastomer fibers or spheres in accordance with some embodiments of the invention.

FIG. 9 illustrates that with limited quantity of the swelling liquid, micro-drop impact and surface spreading, liquid diffusion, and localized swelling can induce non-trivial anisotropic change of the absorbing polymer (such as any of the coated fiber or microsphere structures described herein). Furthermore, the dynamics of these processes is important, where the rapid seal formation of these materials is critical to preventing user exposure to CWA substances. For example, with polymer materials shown as 915, 910, with exposure to agent 905, the agent can impact can spread and diffuse into the polymer causing swelling, shape change and pore sealing (represented as area 920).

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

The invention claimed is:

1. An article of manufacture comprising:
at least one base layer comprising a plurality of overlapping strands;
at least one polymer coating layer at least partially covering at least some portions of at least some strands of at least a portion of the at least one base layer, the at least one polymer coating layer configured and arranged to swell by at least partially absorbing at least one target substance, wherein the at least one polymer coating layer comprises a poly-N-alkyl-N-phenylacrylamide polymer with a monomer sub-unit of:

wherein the alkyl group has between 1 and 18 carbon atoms; and
a plurality of voids distributed between at least some of the overlapping strands, wherein upon swelling by the at least one target substance, at least some of the voids reversibly reduce in size, partially close, or completely seal.

2. The article of claim 1, wherein at least a portion of the at least one base layer includes at least one of weave, knit, mesh, mesh-like material, and/or netting.

3. The article of claim 1, wherein the at least one polymer coating layer comprises polymer microspheres.

4. The article of claim 3, wherein the polymer microspheres are at least one of spray-coated polymer microspheres, dip-coated polymer microspheres, and water-fall coated polymer microspheres.

5. The article of claim 3, wherein the polymer microspheres comprise an elastomer polymer.

6. The article of claim 3, wherein the polymer microspheres comprise a core-shell polymer microsphere.

7. The article of claim 1, wherein the at least one polymer coating layer includes a reactive monomer.

8. The article of claim 7, wherein the reactive monomer is crosslinkable within the at least one polymer layer.

9. The article of claim 1, wherein the strands include a polymer selected from polyester, polypropylene, polyethylene, nylon, rayon, acrylic, polyurethane, Teflon, ethylene-vinyl acetate copolymer, aramid-based polymer, sodium acrylate polymer, and polydimethyl siloxane.

10. The article of claim 1, wherein the strands include a natural or naturally-derived material selected from cotton, wool, silk, cellulosic viscose, cellulosic acetate, cupro, and linen.

11. A method of preparing a self-sealing material or surface comprising:
providing at least one base layer comprising a plurality of overlapping strands and a plurality of voids distributed between at least some of the overlapping strands;
applying at least one polymer coating layer to the at least one base layer so that at least some of the at least one polymer coating layer at least partially covers at least some portions of at least some strands of at least a portion of the at least one base layer, the at least one polymer coating layer swellable by at least partially absorbing at least one target substance, wherein the at least one polymer coating layer comprises poly-N-alkyl-N-phenylacrylamide polymer with a monomer sub-unit of:

wherein the alkyl group has between 1 and 18 carbon atoms; and
wherein upon swelling by the at least one target substance, at least some of the voids reduce in size, partially close, or completely seal.

12. The method of claim 11, wherein the polymer includes at least one of a solid or bulk polymer, polymer microspheres, and monomer.

* * * * *

UNITED STATES PATENT AND TRADEMARK OFFICE
CERTIFICATE OF CORRECTION

PATENT NO. : 10,711,393 B2
APPLICATION NO. : 15/587091
DATED : July 14, 2020
INVENTOR(S) : Konrad Rykaczewski and Timothy Burgin It is certified that error appears in the above-identified patent and that said Letters Patent is hereby corrected as shown below:

In the Claims

Claim 9, Column 9, Line 11, delete "polydimethyl siloxane." and insert -- polydimethylsiloxane. --, therefor.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*